(12) United States Patent
Ito (10) Patent No.: US 11,037,277 B2
(45) Date of Patent: Jun. 15, 2021

(54) IMAGE PROCESSING APPARATUS, IMAGING APPARATUS, LENS APPARATUS, AND IMAGE PROCESSING METHOD

(71) Applicant: CANON KABUSHIKI KAISHA, Tokyo (JP)

(72) Inventor: Akiharu Ito, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 29 days.

(21) Appl. No.: 16/103,736

(22) Filed: Aug. 14, 2018

(65) Prior Publication Data

US 2019/0066275 A1 Feb. 28, 2019

(30) Foreign Application Priority Data

Aug. 25, 2017 (JP) .............................. JP2017-162175
Jul. 13, 2018 (JP) .............................. JP2018-133161

(51) Int. Cl.

| G03B 5/00 | (2021.01) |
|---|---|
| H04N 5/232 | (2006.01) |
| H04N 9/04 | (2006.01) |
| G03B 5/06 | (2021.01) |
| H04N 5/225 | (2006.01) |
| G06T 5/00 | (2006.01) |

(Continued)

(52) U.S. Cl.
CPC .............. G06T 5/006 (2013.01); G03B 5/00 (2013.01); G03B 5/06 (2013.01); H04N 5/232 (2013.01); H04N 5/23229 (2013.01); H04N 5/23296 (2013.01); H04N 9/045 (2013.01); *G03B 2205/00* (2013.01); *G06T 7/50* (2017.01); *G06T 7/60* (2013.01); *H04N 5/2254* (2013.01)

(58) Field of Classification Search
CPC .. H04N 5/232; H04N 5/23296; H04N 5/2254; H04N 5/2253; H04N 5/2251; H04N 5/23229; H04N 9/045; G03B 5/06; G03B 5/00; G03B 2205/00; G06T 5/006; G06T 7/50; G06T 7/60
See application file for complete search history.

(56) References Cited

U.S. PATENT DOCUMENTS 5,079,582 A * 1/1992 Hamada .................... G02B 7/36
                                                                                          250/201.2
9,077,842 B2 * 7/2015 Natsume .................. G03B 5/02

(Continued)

FOREIGN PATENT DOCUMENTS

| CN | 105934708 A | 9/2016 |
|---|---|---|
| JP | 2010-191076 A | 9/2010 |

(Continued)

*Primary Examiner* — Lin Ye
*Assistant Examiner* — John H Morehead, III
(74) *Attorney, Agent, or Firm* — Canon U.S.A., Inc. IP Division (57) ABSTRACT

There is provided an image processing apparatus capable of making an optical characteristic correction corresponding to a shift in the position of an optical axis by a tilt operation. The image processing apparatus performs the optical characteristic correction, in accordance with correction data including a value corresponding to an image height with reference to a correction center position. The image processing apparatus changes the correction center position in image data according to a tilt operation of the tilt mechanism.

20 Claims, 8 Drawing Sheets

(51) Int. Cl.
  *G06T 7/60* (2017.01)
  *G06T 7/50* (2017.01)

(56) References Cited

U.S. PATENT DOCUMENTS

| | | | | |
|---|---|---|---|---|
| 2005/0047291 A1* | 3/2005 | Kuze | ............... | G11B 7/1381 |
| | | | | 369/44.32 |
| 2014/0028839 A1* | 1/2014 | Ishibashi | ............ | H04N 5/3572 |
| | | | | 348/140 |
| 2014/0071336 A1* | 3/2014 | Takanashi | ............ | G03B 17/14 |
| | | | | 348/360 |
| 2014/0211030 A1* | 7/2014 | Hideshima | ............ | G03B 5/00 |
| | | | | 348/208.11 |
| 2015/0077585 A1* | 3/2015 | Kobayashi | ........... | G02B 3/0037 |
| | | | | 348/222.1 |
| 2015/0153584 A1* | 6/2015 | Yasuda | ............. | G02B 27/646 |
| | | | | 359/557 |
| 2016/0261801 A1* | 9/2016 | Horikawa | ......... | H04N 5/23212 |
| 2018/0157152 A1* | 6/2018 | Ajito | ................ | H04N 5/3572 |

FOREIGN PATENT DOCUMENTS

| | | |
|---|---|---|
| JP | 2012-141516 A | 7/2012 |
| JP | 2014-27570 A | 2/2014 |
| JP | 2017-011571 A | 1/2017 |

\* cited by examiner

IMAGE PROCESSING APPARATUS, IMAGING APPARATUS, LENS APPARATUS, AND IMAGE PROCESSING METHOD

BACKGROUND OF THE INVENTION

Field of the Invention

The aspect of the embodiments relates to correction processing on image data captured by using a lens apparatus capable of a tilt operation.

Description of the Related Art

Image data obtained by imaging is affected by aberrations based on the optical characteristics of the lens apparatus used for imaging. An imaging apparatus or an image processing apparatus receiving the captured image data can reduce the effect of the aberrations on the image data by making corrections on the image data. Correction data on the aberrations here has values corresponding to a distance from a reference position, with the position of an optical axis on an image forming plane of an image sensor as the reference position.

There is a tilt-shift lens apparatus which includes mechanisms for enabling a tilt operation and a shift operation of a lens.

Distortion due to different distances of objects can be adjusted by the tilt-shift lens apparatus mounted on an imaging apparatus and using a shift mechanism of the tilt-shift lens apparatus. By using a tilt mechanism, the range of focusing positions of the imaging apparatus can be also adjusted.

A shift operation on the lens changes a relative position between the lens position and an imaging surface of the image sensor, whereby the position of the optical axis on the image forming plane of the image sensor is changed. A tilt operation on the lens makes an optical transfer function of the lens apparatus not rotationally symmetrical.

Japanese Patent Application Laid-Open No. 2014-27570 discusses a configuration in which a correction data set is prepared for correcting aberration with respect to each shift amount and each tilt amount of a lens, and any one of the correction data set is selected according to the shift amount and the tilt amount during imaging.

However, the position of the optical axis on the image forming plane of the image sensor changes not only when the lens is operated to shift but when the lens is operated to tilt. Japanese Patent Application Laid-Open No. 2014-27570 includes no discussion about a change in the position of the optical axis on the image forming plane of the image senor according to the tilt amount of the lens.

Therefore an image processing apparatus capable of making an optical characteristic correction corresponding to a shift in the position of the optical axis by a tilt operation is sought.

SUMMARY OF THE INVENTION

According to an aspect of the embodiments, an image processing apparatus includes a correction circuit that makes a correction according to an optical characteristic of a lens apparatus on image data captured by using the lens apparatus, the lens apparatus including a tilt mechanism that tilts a lens with respect to an imaging surface of an image sensor included in an imaging apparatus, wherein the correction circuit makes the correction according to the optical characteristic, in accordance with correction data including a value corresponding to an image height with reference to a correction center position, and change the correction center position in the image data according to a tilt operation of the tilt mechanism.

According to another aspect of the embodiments, an imaging apparatus includes an image sensor that generates image data, a mount unit on which a lens apparatus including a tilt mechanism that tilts a lens with respect to an imaging surface of the image sensor is mounted, and a correction circuit that makes a correction according to an optical characteristic of the lens apparatus on image data generated by the image sensor by performing image capturing using the lens apparatus, wherein the correction circuit makes the correction according to the optical characteristic, in accordance with correction data including a value corresponding to an image height with reference to a correction center position, and change the correction center position in the image data according to a tilt operation of the tilt mechanism.

According to yet another aspect of the embodiments, a lens apparatus to be mounted on an imaging apparatus including an image sensor includes a tilt mechanism that performs a tilt operation for tilting a lens with respect to an imaging surface of the image sensor, a memory that stores information about the lens apparatus, and a communication apparatus that transmits the information stored in the memory to an external apparatus, wherein the information includes information corresponding to a distance from a rotation center for tilting the lens to the imaging surface of the image sensor, and information about a tilt angle of the tilt operation.

Further features of the disclosure will become apparent from the following description of exemplary embodiments with reference to the attached drawings.

DESCRIPTION OF THE EMBODIMENTS

An exemplary embodiment of the disclosure will be described in detail below with reference to the accompanying drawings.

The exemplary embodiment of the disclosure will be described by using a camera lens system, in which a lens apparatus including a tilt mechanism and a shift mechanism is mounted on an imaging apparatus, as an example. The tilt mechanism is a mechanism for tilting a lens with respect to an imaging surface. The shift mechanism is a mechanism for moving an optical lens in parallel with the imaging surface.

Figure 1:
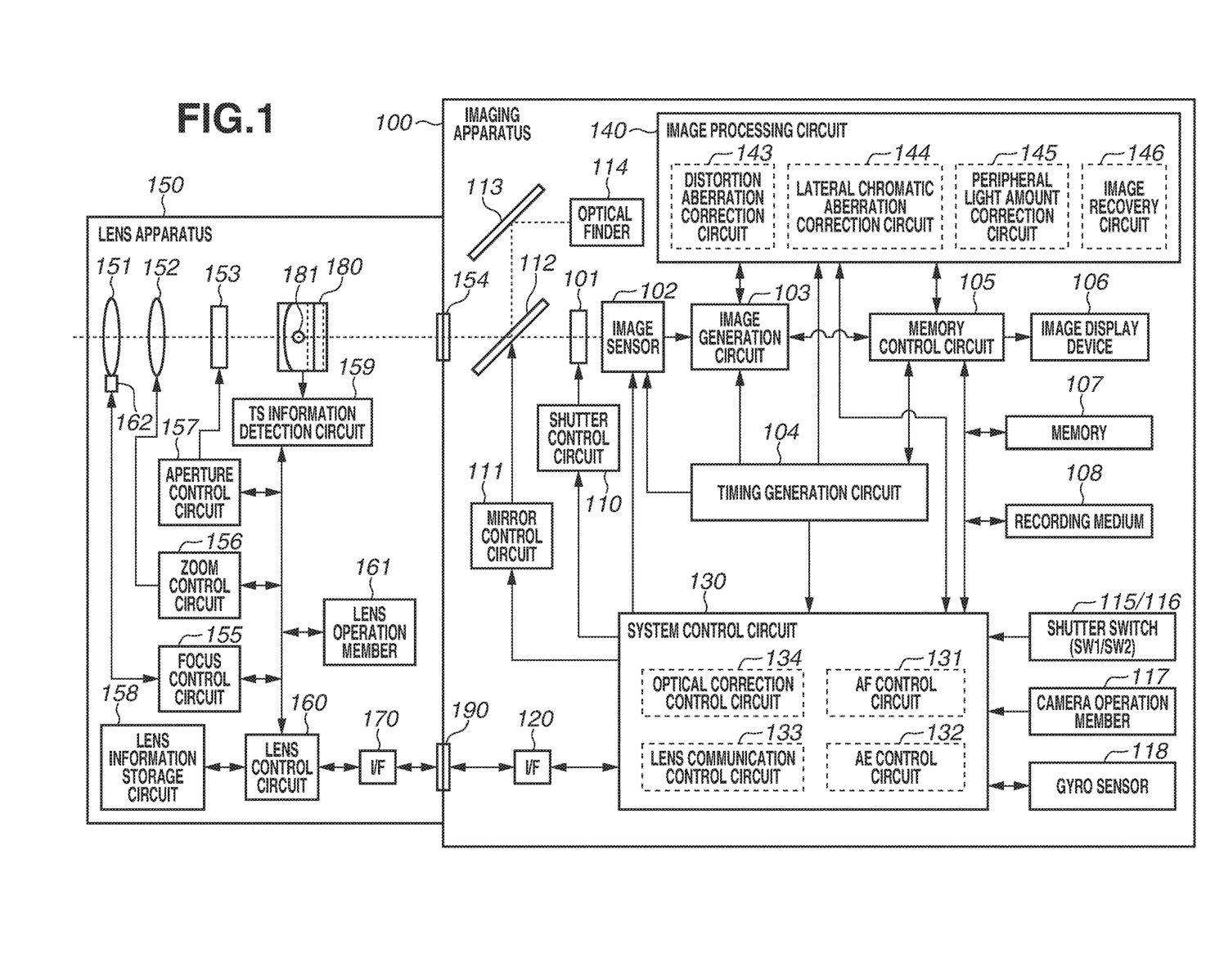
FIG. 1 is a schematic block diagram of a camera lens system including a lens apparatus and an imaging apparatus according to an exemplary embodiment of the disclosure.

FIG. 1 is a schematic block diagram of the camera lens system including the lens apparatus and the imaging apparatus, according to the exemplary embodiment of the disclosure. As illustrated in FIG. 1, a lens apparatus 150 having a tilt-shift function is detachably mounted on an imaging apparatus 100 via a lens mount unit 154. The lens mount unit 154 is a part where the imaging apparatus 100 makes contact with the lens apparatus 150.

The internal configuration of the imaging apparatus 100 will initially be described.

For example, a charge-coupled device (CCD) sensor or a complementary metal-oxide-semiconductor (CMOS) sensor is used as an image sensor 102. The image sensor 102 converts an object image formed by the lens apparatus 150 into an electrical signal. An example of the image sensor 102 is a single-panel image area sensor in which pixels having red, green, and blue (RGB) color filters of Bayer arrangement are arranged in a matrix. The image sensor 102 is not limited to the Bayer arrangement. An image sensor including an array of complementary color filters instead of the RGB color filters may be used.

An image generation circuit 103 converts an analog output signal of the image sensor 102 into a digital signal to form an image. The generated image is input to a memory control circuit 105 and an image processing circuit 140.

A timing generation circuit 104 supplies a clock signal and a synchronization signal to the image sensor 102, the image generation circuit 103, the memory control circuit 105, a system control circuit 130, and the image processing circuit 140.

The memory control circuit 105 controls the image generation circuit 103, the timing generation circuit 104, an image display device 106, a memory 107, a recording medium 108, and the image processing circuit 140. Output data from the image generation circuit 103 is written to the memory 107 and the recording medium 108 via the image processing circuit 140 and the memory control circuit 105.

The image display device 106 is a display composed of a liquid crystal display (LCD) or an organic electroluminescence (EL) display. The image display device 106 successively displays pieces of image data captured by using the image sensor 102 to implement an electronic viewfinder (EVF) function. During image reproduction, the image display device 106 displays images recorded in the memory 107 and the recording medium 108. The image display device 106 also displays operation information and imaging information to a user.

The memory 107 stores captured still images and moving images, and is used as a work area of the system control circuit 130. The memory 107 also stores data about optical aberration corrections, communicated from the lens apparatus 150. The memory 107 may obtain the data about the optical aberration corrections from outside via a not-illustrated external communication interface, not from the lens apparatus 150. The data about the optical aberration corrections may be stored in the memory 107 in advance.

The recording medium 108 includes a nonvolatile memory provided inside the imaging apparatus 100 or detachably attachable to the imaging apparatus 100. The recording medium 108 stores captured still images and moving images.

A shutter control circuit 110 controls driving of a shutter 101 in cooperation with a mirror control circuit 111, based on a control signal from the system control circuit 130.

The mirror control circuit 111 controls driving of a main mirror 112 based on a control signal from the system control circuit 130.

The main mirror 112 switches the destination of a light beam incident via the lens apparatus 150 between an optical finder 114 and the image sensor 102. During imaging, the main mirror 112 is retracted from an imaging optical path to let the light beam to the image sensor 102. In other cases, the main mirror 112 is located in the imaging optical path to guide the light beam to the optical finder 114. The main mirror 112 may be configured as a half mirror so that part of the light can be transmitted through the center portion. Part of the light beam may thereby be transmitted to be incident on a not-illustrated focus detection sensor for performing focus detection.

A pentaprism 113 guides the light beam reflected by the main mirror 112 to the optical finder 114. If a mirrorless camera is used as the imaging apparatus 100, the mirror control circuit 111, main mirror 123, pentaprism 113, and optical finder 114 are not needed.

A switch-1 (SW1) 115 generates a signal for instructing the system control circuit 130 to start operation of automatic focus (AF) processing, automatic exposure (AE) processing, and automatic white balance (AWB) processing according to the user's operation.

A switch-2 (SW2) 116 generates a signal for instructing the system control circuit 130 to start exposure according to the user's operation. Receiving the instruction to start exposure, the system control circuit 130 controls the image sensor 102, the memory control circuit 105, the shutter control circuit 110, the mirror control circuit 111, and, via an interface (I/F) 120, the lens apparatus 150 to perform processing for recording image data on the recording medium 108.

A camera operation member 117 includes various buttons, a touch panel, and a power on-off button. The camera operation member 117 outputs instructions accepted through user operations to the system control circuit 130. According to the user operations on the camera operation member 117, the system control circuit 130 performs various functions implemented in the imaging apparatus 100. Examples include switching of operation modes such as an AF mode and an AE mode.

A gyro sensor 118 generates and transmits orientation information about the imaging apparatus 100 to the system control circuit 130.

The I/F 120 performs communication using electrical signals between the system control circuit 130 in the imaging apparatus 100 and a lens control circuit 160 in the lens apparatus 150 via a connector 190. The imaging apparatus 100 thereby transmits and receives information and control commands of the lens apparatus 150.

The system control circuit 130 is an in-camera central processing unit (CPU) which governs various controls on a camera main body. The system control circuit 130 controls the entire camera lens system including the lens apparatus 150 and the imaging apparatus 100 according to inputs from the SW1, the SW2, the memory control circuit 105, and the camera operation member 117.

An AF control circuit 131 is implemented in the system control circuit 130, and controls the AF processing of the imaging apparatus 100. In the AF processing, the AF control circuit 131 calculates a focus lens driving amount from lens information such as a focus position and a focal length obtained from the lens apparatus 150 via the I/F 120, and an AF evaluation value. The focus lens driving amount is input to the lens apparatus 150 via a lens communication control circuit 133 and the I/F 120.

An AE control circuit 132 is implemented in the system control circuit 130, and controls the AE processing of the imaging apparatus 100. In the AE processing, the AE control circuit 132 calculates exposure control amounts (such as an aperture control amount, a shutter control amount, and exposure sensitivity) from lens information such as an open F value and the focal length obtained from the lens apparatus 150 via the I/F 120, and an AE evaluation value. The aperture control amount is input to the lens apparatus 150 via the lens communication control circuit 133 and the I/F 120. The shutter control amount is input to the shutter control circuit 110. The exposure sensitivity is input to the image sensor 102.

The lens communication control circuit 133 is implemented in the system control circuit 130, and controls communication processing between the imaging apparatus 100 and the lens apparatus 150. If the lens communication control circuit 133 detects via the I/F 120 that the lens apparatus 150 is mounted, the imaging apparatus 100 and the lens apparatus 150 start communication.

For example, if the imaging apparatus 100 transmits an information request signal, the lens apparatus 150 transmits information about a lens to the imaging apparatus 100 according to processing procedure of the flowchart of FIG. 2 to be described below.

The imaging apparatus 100 and the lens apparatus 150 perform communication at arbitrary timing. The imaging apparatus 100 and the lens apparatus 150 may perform communication at timing based on an imaging synchronization signal output from the timing generation circuit 104, aside from arbitrary timing. In such an imaging synchronization signal communication mode, if the imaging synchronization signal is input from the timing generation circuit 104, the lens apparatus 150 may transmit pieces of lens information needed in the imaging synchronization signal communication mode (such as a focus lens position, a focus lens state, an aperture state, and the focal length) at a time.

An optical correction control circuit 134 reads optical aberration correction information from the memory 107 according to the received lens information, and calculates correction data on optical aberrations from the read optical aberration correction information. The optical correction control circuit 134 sets the calculated optical aberration correction data into the image processing circuit 140, and performs control about optical aberration corrections. Examples of the optical aberration corrections include a distortion aberration correction, a lateral chromatic aberration correction, a peripheral light amount correction, and image recovery processing.

The image processing circuit 140 performs image processing on image data from the image generation circuit 103 or image data from the memory control circuit 105. The image-processed image data is stored into the memory 107 or the recording medium 108 via the memory control circuit 105.

A distortion aberration correction circuit 143 receives correction data on distortion aberration, calculated by the optical correction control circuit 134, and performs correction processing of distortion aberration on the image data. A lateral chromatic aberration correction circuit 144 receives correction data on lateral chromatic aberration, calculated by the optical correction control circuit 134, and performs correction processing of lateral chromatic aberration on the image data. A peripheral light amount correction circuit 145 receives correction data on a peripheral light amount, calculated by the optical correction control circuit 134, and performs correction processing of the peripheral light amount on the image data. An image recovery circuit 146 receives correction data on the image recovery processing, calculated by the optical correction control circuit 134, and performs the image recovery processing on the image data.

The image processing circuit 140 further performs predetermined pixel interpolation processing and color conversion processing to generate image data. The image processing circuit 140 also performs predetermined calculation processing by using digital image data.

Next, the internal configuration of the lens apparatus 150 will be described.

A focus lens 151 moves in an optical axis direction to change the focus of an imaging optical system. A zoom lens 152 moves in the optical axis direction to change the focal length of the imaging optical system. A diaphragm 153 has a variable aperture diameter (aperture value), and changes a light amount according to the aperture diameter. While FIG. 1 illustrates the imaging optical system as two lenses, the imaging optical system may be a lens group of three or more lenses including one for image stabilization. Rays of light incident via the imaging optical system are guided to the image sensor 102 and form an optical image on the image sensor 102.

A focus control circuit 155 is controlled by the lens control circuit 160 or a lens operation member 161, and drives the focus lens 151. The focus control circuit 155 outputs focus information, such as the position of the focus lens 151, to the lens control circuit 160.

A zoom control circuit 156 is controlled by the lens control circuit 160 or the lens operation member 161, and drives the zoom lens 152. The zoom control circuit 156 outputs zoom information, such as the focal length, to the lens control circuit 160.

An aperture control circuit 157 is controlled by the lens control circuit 160 or the lens operation member 161, and drives the diaphragm 153. The aperture control circuit 157 outputs aperture information, such as the aperture value, to the lens control circuit 160.

A lens information storage circuit 158 stores the lens information including information about the optical aberrations of the lenses 151 and 152. A tilt-shift (TS) information detection circuit 159 detects TS information (information about a tilt amount and a shift amount), and outputs the detected TS information to the lens control circuit 160.

The lens control circuit 160 controls the focus control circuit 155, the zoom control circuit 156, the aperture control circuit 157, and the lens information storage circuit 158 according to inputs from the lens operation member 161 or an I/F 170. The lens control circuit 160 also transmits information input from the control circuits and detection units to the imaging apparatus 100 via the I/F 170 according to a lens information acquisition command received by the I/F 170.

The lens operation member 161 includes a focus operation ring, a zoom operation ring, an AF/manual focus (MF) switch, an image stabilizer (IS) on-off switch, and a TS operation lever. The lens operation member 161 outputs instructions accepted through user operations to the lens control circuit 160.

The lens control circuit 160 transmits the content of the user operations to the imaging apparatus 100 via the I/F 170 based on the instructions input from the lens operation member 161. The system control circuit 130 in the imaging apparatus 100 receives the content of the user operations via the I/F 120, and switches operation modes about various functions implemented in the lens apparatus 150.

An encoder 162 is a position detection sensor such as a magnetic sensor and an optical sensor using infrared rays. The encoder 162 detects and outputs the position of the focus lens 151 to the lens control circuit 160.

The I/F 170 performs communication using electrical communications between the system control circuit 130 in the imaging apparatus 100 and the lens control circuit 160 in the lens apparatus 150 via the connector 190. The I/F 170 thereby transmits and receives information and control commands of the lens apparatus 150.

A TS mechanism 180 includes a tilt mechanism and a shift mechanism. The tilt mechanism tilts the entire optical system with respect to an imaging surface with reference to a rotation center axis 181 of a tilt operation. The shift mechanism moves the optical axis of the optical system in parallel with the imaging surface.

Figure 2A:
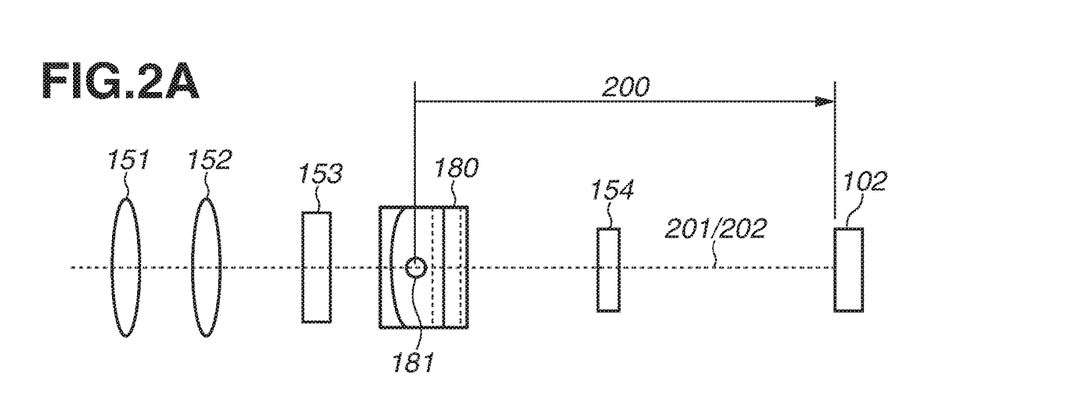
FIG. 2A is a schematic diagram illustrating the imaging apparatus and the lens apparatus in a state where neither a tilt operation nor a shift operation is performed.
Figure 2B:
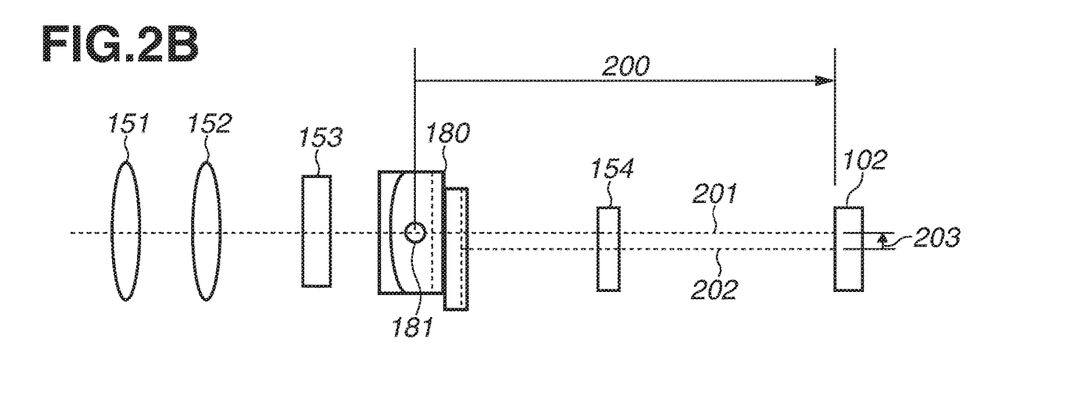
FIG. 2B is a schematic diagram illustrating the imaging apparatus and the lens apparatus in a state where only a shift operation is performed.
Figure 2C:
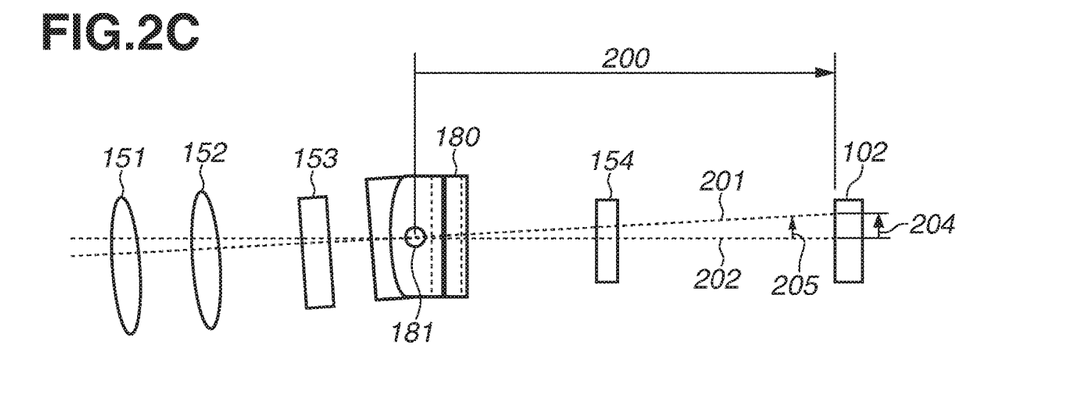
FIG. 2C is a schematic diagram illustrating the imaging apparatus and the lens apparatus in a state where only a tilt operation is performed.

FIGS. 2A to 2C are diagrams for describing a relationship between the optical axis of the lens apparatus 150 and the center position of the imaging surface of the image sensor 102 of the imaging apparatus 100.

FIG. 2A is a schematic diagram illustrating the imaging apparatus 100 and the lens apparatus 150 in a state where neither a tilt operation nor a shift operation is performed. FIG. 2B is a schematic diagram during a shift operation. FIG. 2C is a schematic diagram during a tilt operation.

FIGS. 2A to 2C illustrate a tilt rotation center distance 200, an optical axis 201, a normal 202 that passes through the center of the imaging surface of the image sensor 102, optical axis moving amounts 203 and 204, and a tilt angle 205. The tilt rotation center distance 200 refers to a distance between the rotation center axis 181 of the tilt mechanism and the imaging surface of the image sensor 102. The optical axis moving amount 203 is the moving amount of the optical axis when the shift mechanism of the TS mechanism 180 is driven. The optical axis moving amount 204 is the moving amount of the optical axis when the tilt mechanism is driven.

FIG. 2A illustrates a state in which neither a tilt operation nor a shift operation is performed on the optical system of the lens apparatus 150. Here, the optical axis 201 coincides with the normal 202. FIG. 2B illustrates a state in which the optical axis 201 is moved in parallel by the shift mechanism as much as the optical axis moving amount 203 with respect to the center of the imaging surface. FIG. 2C illustrates a state in which the optical axis 201 is tilted by the tilt mechanism as much as the tilt angle 205 with respect to the imaging surface. The optical axis moving amount 204 which is the distance between the optical axis 201 and the normal 202 here can be calculated from the tilt angle 205 and the tilt rotation center distance 200.

The lens apparatus 150 stores information about the tilt rotation center distance 200 in the lens information storage circuit 158. The lens control circuit 160 transmits the information to the imaging apparatus 100. Instead of the tilt rotation center distance 200, other related information may be used. For example, information that indicates a distance between the tilt rotation center axis and the lens mount or a coefficient expressing the ratio of the tilt rotation center distance 200 to a predetermined reference distance (fixed value) may be used. Alternatively, information about a plurality of tilt rotation center distances may be stored in the memory 107 in advance. The system control circuit 300 may select a corresponding tilt rotation center distance according to identification information about the lens apparatus 150.

Figure 3:
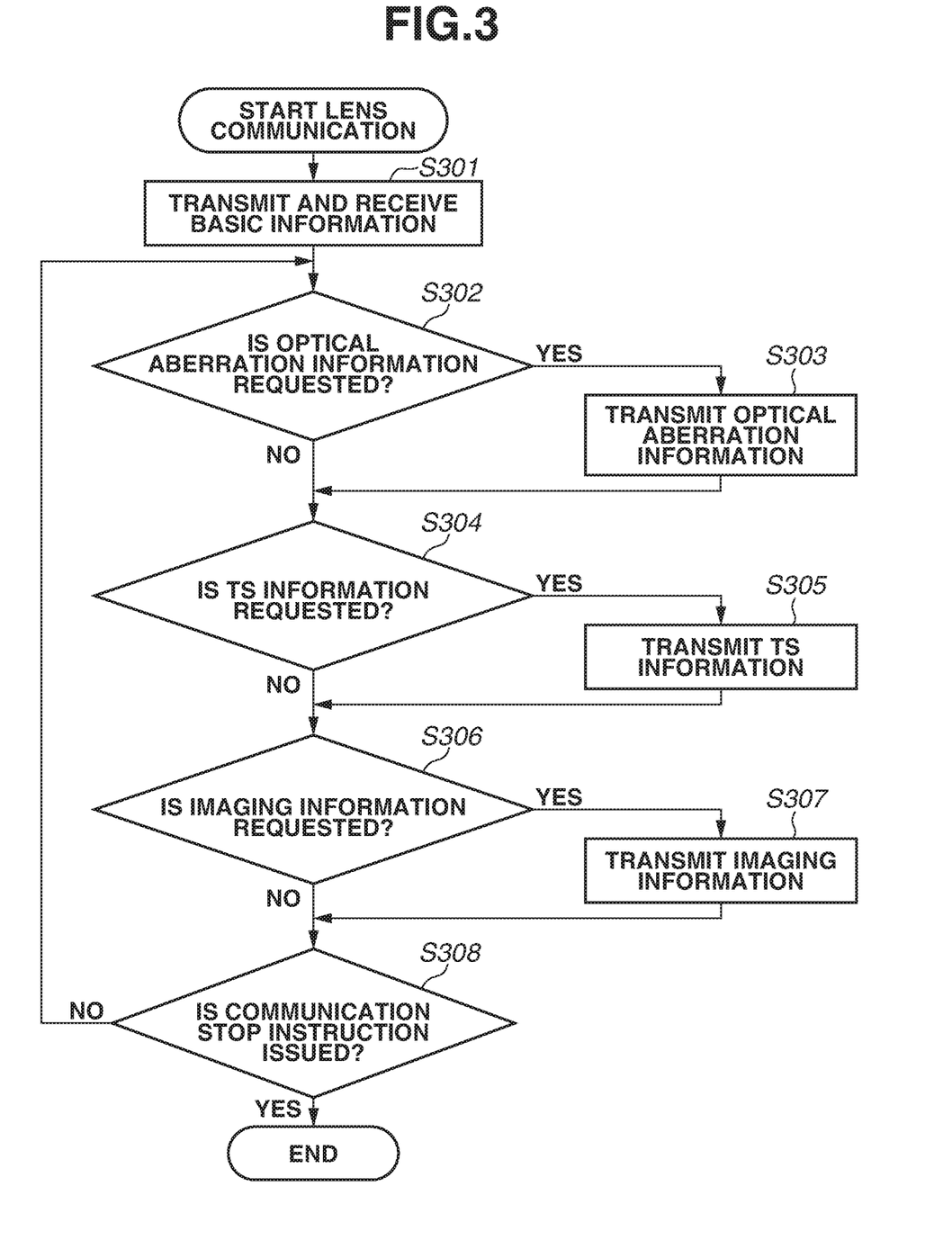
FIG. 3 is a lens data communication flowchart of the lens apparatus and the imaging apparatus according to the exemplary embodiment of the disclosure.

FIG. 3 illustrates a lens data communication flowchart of the lens apparatus 150 and the imaging apparatus 100.

The lens apparatus 150 starts lens communication according to an instruction from the imaging apparatus 100.

In step S301, the lens control circuit 160 transmits information about the lenses 151 and 152 (for example, the presence or absence of TS information), stored in the lens information storage circuit 158, to the imaging apparatus 100. The system control circuit 130 of the imaging apparatus 100 transmits and receives basic information. For example, the system control circuit 130 transmits model information to the lens apparatus 150.

In step S302, the lens control circuit 160 determines whether optical aberration information is requested by the imaging apparatus 100. In a case where optical aberration information is requested (YES in step S302), the processing proceeds to step S303.

In step S303, the lens control circuit 160 transmits optical aberration information to the imaging apparatus 100. The lens control circuit 160 simultaneously transmits optical aberration information about the distortion aberration correction, the lateral chromatic aberration correction, the peripheral light amount correction, and the image recovery processing, stored in the lens information storage circuit 158. The lens control circuit 160 may individually transmit the pieces of optical aberration information according to requests from the system control circuit 130.

In step S304, the lens control circuit 160 determines whether the TS information is requested by the imaging apparatus 100. In a case where the TS information is request (YES in step S304), the processing proceeds to step S305.

In step S305, the lens control circuit 160 transmits the TS information stored in the lens information storage circuit 158 to the imaging apparatus 100.

In step S306, the lens control circuit 160 determines whether the imaging information is requested by the imaging apparatus 100. In a case where the imaging information is requested (YES in step S306), the processing proceeds to step S307.

In step S307, the lens control circuit 160 transmits the imaging information to the imaging apparatus 100.

In step S308, the lens control circuit 160 determines whether a communication stop instruction is issued from the system control circuit 130. In a case where there is a communication stop instruction issued (YES in step S308), the lens control circuit 160 ends the lens communication. In a case where there is no communication stop instruction (NO in step S308), the processing returns to step S302.

Figure 4:
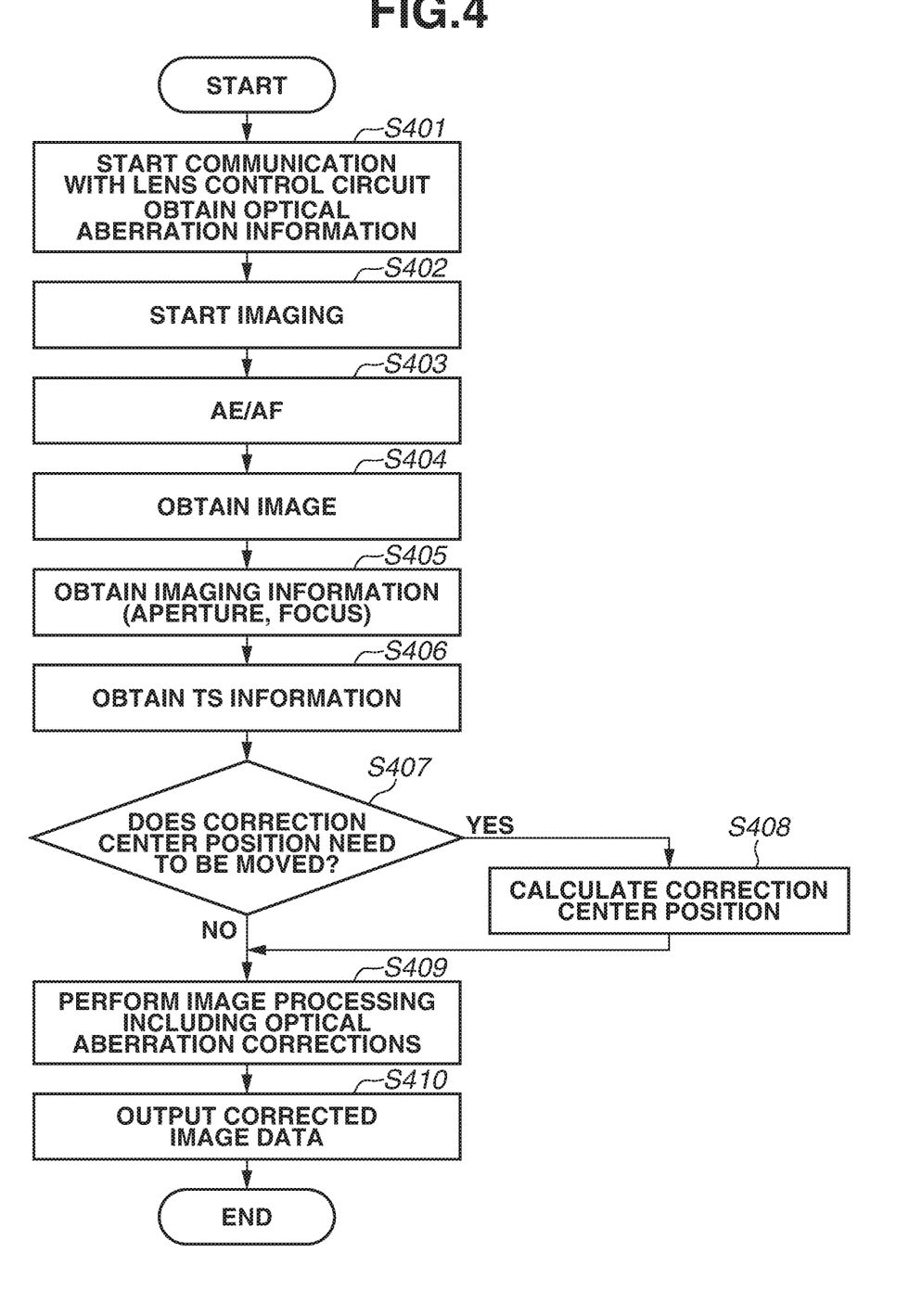
FIG. 4 is an operation flowchart of correction processing of optical aberrations according to the exemplary embodiment of the disclosure.

Next, the correction processing of the optical aberrations will be described with reference to FIG. 4. FIG. 4 is an operation flowchart of the correction processing of the optical aberrations according to the present exemplary embodiment. The imaging apparatus 100 performs the correction processing of the optical aberrations (distortion aberration correction processing, lateral chromatic aberration correction processing, peripheral light amount correction processing, and image recovery processing) according to processing procedure of this flowchart.

In step S401, the system control circuit 130 starts communication with the lens control circuit 160 of the lens apparatus 150. The system control circuit 130 obtains and stores the optical aberration information into the memory 107. The system control circuit 130 also starts to capture a moving image for a live view display.

In step S402, if the SW1 (115) is detected to be operated by the user, the system control circuit 130 determines that an operation for imaging is started.

In step S403, the system control circuit 130 performs exposure control (AE) and automatic focus detection control (AF).

In step S404, if the SW2 (116) is detected to be operated by the user, the system control circuit 130 starts to capture an image for recording and obtains the image. If the SW2 (116) is not detected to be operated, the system control circuit 130 repeats the processing of step S403 until the SW2 (116) is detected to be operated.

In step S405, the system control circuit 130 obtains the imaging information about the lens apparatus 150 when the image for recording is captured in step S404. The imaging information includes information about the aperture value, the focal length, and the imaging distance which may be needed for the optical aberration corrections.

In step S406, the system control circuit 130 obtains the TS information about the lens apparatus 150 when the image for recording is captured in step S404. If the TS information is successfully obtained, the system control circuit 130 determines that the lens apparatus 150 is capable of a TS operation. The system control circuit 130 displays on the image display device 106 and notifies the user of the determination.

In step S407, the system control circuit 130 determines from the TS information obtained in step S406 whether a correction center position of the optical aberration corrections is to be moved. In a case where the correction center position is determined to be moved (YES in step S407), the processing proceeds to step S408. In the case of a TS lens, the optical axis does not coincide with the center of the imaging surface in a state where a tilt or shift operation is performed, e.g., in the state illustrated in FIG. 3B or 3C. The correction center position of the optical aberration corrections therefore is to be moved. If the mounted lens apparatus 150 includes no TS mechanism or if the TS information for calculation of the correction center position of the optical correction aberrations fails to be obtained (NO in step S407), the processing proceeds to step S409 without going through step S408.

In step S408, the system control circuit 130 calculates the correction center position of the optical aberration corrections. In the present exemplary embodiment, the moving amount of the correction center position by a tilt operation is converted into the moving amount by a shift operation. The system control circuit 130 calculates the entire optical axis moving amount by separately determining the moving amount of the correction center position by a shift operation and the converted moving amount of the correction center position by a tilt operation, and adding the moving amounts. Details of the method for calculating the correction center position will be described below.

In step S409, the system control circuit 130 performs image processing including the optical aberration corrections on the image data. If no optical aberration correction is to be performed, the image processing circuit 140 may perform only processing not related to optical aberration corrections, such as pixel interpolation processing and color conversion processing. Details of the correction processing of the optical aberrations will be described below.

In step S410, the system control circuit 130 outputs the optical aberration-corrected image data to the memory control circuit 105. The image data output to the memory control circuit 105 is recorded in the memory 107 or on the recording medium 108.

Next, the method for calculating the correction center position of the optical aberration corrections and an operation of a method for correcting the optical aberrations will be described with reference to FIGS. 5A to 5F. The description will be given by using the lateral chromatic aberration correction as an example. The peripheral light amount correction, the distortion aberration correction, and the image recovery processing can be performed in a similar manner.

Figure 5A:
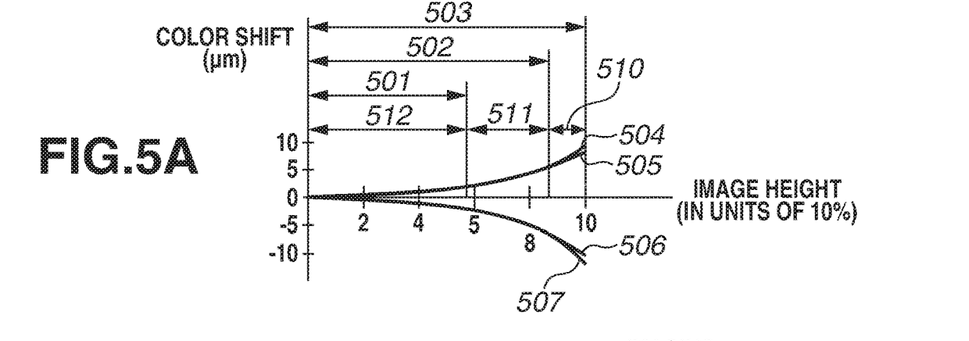
FIG. 5A is a chart illustrating an example of correction data for performing a lateral chromatic aberration correction.

FIG. 5A illustrates an example of correction data for performing the lateral chromatic aberration correction. The correction data includes discrete data at a plurality of different image heights. The optical correction control circuit 134 in the system control circuit 130 reads the discrete data from the memory 107, and calculates correction data by interpolation calculation. In FIGS. 5A to 5F, the aperture is assumed to be open, and the focal length is assumed to be the maximum focal length.

The horizontal axis indicates the image height of a pixel to be corrected. The vertical axis indicates the amount of correction. In the present exemplary embodiment, the lateral chromatic aberration correction is performed by using the correction data according to the image height of the pixel to be corrected. The horizontal axis expresses the center position of the optical axis as an image height of 0%, and the maximum possible value of the image height for correction as an image height of 100%.

Figure 5B:
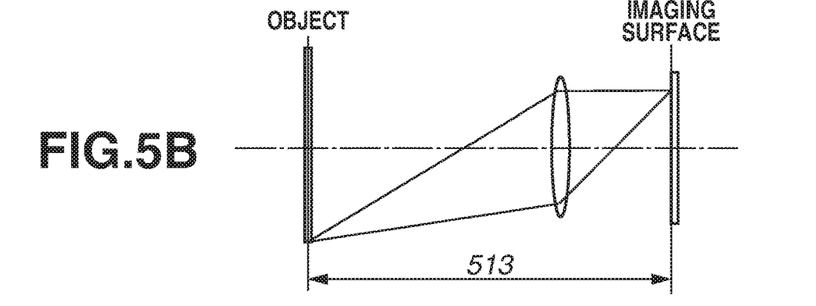
FIG. 5B is a diagram for describing rays of light when an object image is focused on an imaging surface in a state where a lens is not operated to tilt.
Figure 5C:
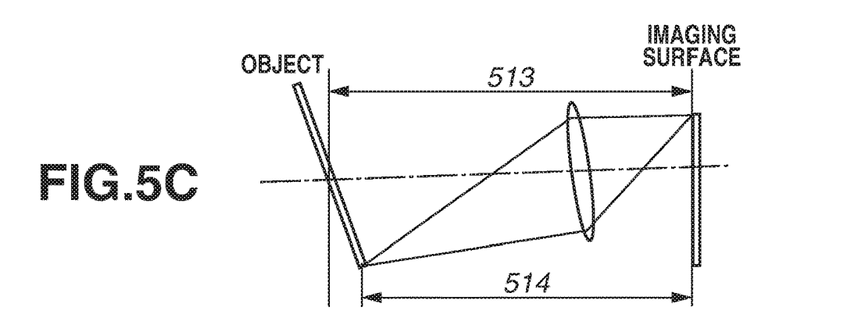
FIG. 5C is a diagram for describing the image height in a case where rays are focused on a position away from a center of the optical axis in a state where the lens is operated to tilt.

A curve 504 represents correction data on the lateral chromatic aberration of red in a case where a distance from an object in focus to the imaging surface is a distance indicated by the arrow 514 as illustrated in FIG. 5C to be described below. A curve 505 represents the correction data on the lateral chromatic aberration of red in a case where the distance from the object in focus to the imaging surface is a distance indicated by the arrow 513 as illustrated in FIG. 5B to be described below. A curve 506 represents correction data on the lateral chromatic aberration of blue in the case where the distance from the object in focus to the imaging surface is the distance indicated by the arrow 513 as illustrated in FIG. 5B. A curve 507 represents the correction data on the lateral chromatic aberration of blue in the case where the distance from the object in focus to the imaging surface is the distance indicated by the arrow 514 as illustrated in FIG. 5C.

The lateral chromatic aberration refers to a phenomenon in which red and blue components of an image distort separately. Correction is made by shifting inner or outer pixels as much as the correction data so that the barycentric positions of the signals of such color components coincide with that of the signal of a green component. The correction data on the lateral chromatic aberration is prepared for respective imaging distances, aperture values, and focal lengths. Correction data according to the imaging condition is selected.

In the present exemplary embodiment, the correction data is point-symmetrical about the optical axis. By virtue of the point symmetricity about the optical axis, the correction data according to the imaging distance, aperture value, and focal length has only to be prepared for each image height, instead of each set of coordinate values. The capacity for storing the correction data can thus be suppressed.

FIG. 5B is a diagram for describing rays of light in a state where the lens is not operated to tilt and the object image is focused on the imaging surface. If the lens is not operated to tilt, the distance from the object in focus to the imaging surface in the case of the rays focused on the center position of the imaging surface and that in the case of the rays focused on a position away from the center of the optical axis on the imaging surface are expressed by the same arrow 513. FIG. 5C is a diagram for describing the image height in a case where rays are focused on a position away from the center of the optical axis in a state where the lens is operated to tilt. According to the Scheimpflug principle, if the lens is operated to tilt, the plane on which the object is in focus also tilts. As illustrated in FIG. 5C, in the case of the rays focused on the position away from the center of the optical axis, the distance from the object in focus to the imaging surface becomes the distance indicated by the arrow 514 which is shorter than the arrow 513. By contrast, at the center position of the image, the imaging distance remains unchanged even if the plane on which the object is in focus tilts. The distance from the object in focus to the imaging surface is thus the distance indicated by the arrow 513. The correction data on the lateral chromatic aberration therefore is to be changed according to imaging distance information and the tilt amount.

Figure 5D:
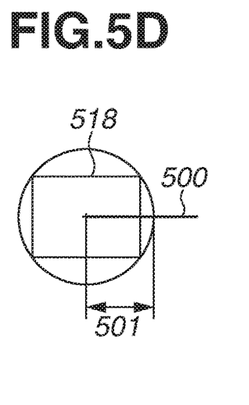
FIG. 5D is a diagram illustrating an imaging surface of an image sensor in a case where neither a tilt operation nor a shift operation is performed and an optical axis coincides with the center of the imaging surface.
Figure 5E:
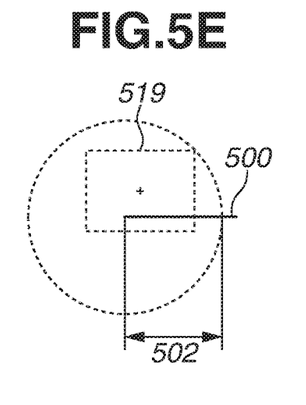
FIG. 5E is a diagram illustrating the imaging surface of the image sensor when a shift mechanism is driven to the maximum without a tilt operation.
Figure 5F:
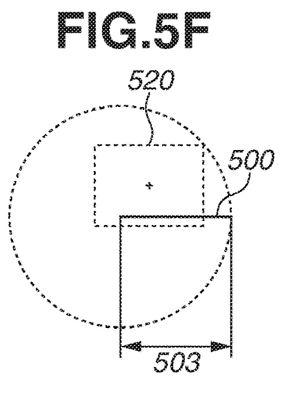
FIG. 5F is a diagram illustrating the imaging surface of the image sensor when the shift mechanism is driven to the maximum and a tilt mechanism is also driven to the maximum.

FIGS. 5D to 5F are schematic views of the image sensor 102 as seen in an object-side direction of the optical axis. A segment 500 corresponds to the horizontal axis of 0% to 100% in image height in FIG. 5A. As illustrated in FIG. 5A, the same correction data is applied to a plurality of pixels at the same image height from the center of the optical axis.

In FIG. 5D, an imaging surface 518 represents the imaging surface of the image sensor 102 in a case where neither a tilt operation nor a shift operation is performed and the optical axis coincides with the center of the imaging surface. Since the optical axis coincides with the correction center position of the optical aberration, the lateral chromatic aberration correction is performed by using only the correction data of the image heights included in the range indicated by the arrow 501 of FIG. 5A.

In FIG. 5E, an imaging surface 519 represents the imaging surface of the image sensor 102 when the shift mechanism is driven to the maximum without a tilt operation. Since the optical axis is moved by the driving of the shift mechanism, the optical aberration correction is performed with the position of the optical axis, not the center position of the imaging surface, as the correction center position. In such a case, the lateral chromatic aberration correction is performed by using the correction data of the image heights included in the range indicated by the arrow 502 which is longer than the arrow 501 of FIG. 5A.

In FIG. 5F, an imaging surface 520 represents the imaging surface of the image sensor 102 when the shift mechanism is driven to the maximum and the tilt mechanism is also drive to the maximum. In such a case, the lateral chromatic aberration correction is performed by using the correction data of the image heights included in the range indicated by the arrow 503 which is even longer than the arrow 502 of FIG. 5A.

In FIG. 5A, the image height zone indicated by the arrow 512 includes the correction data that is used in the case where neither a shift operation nor a tilt operation is performed and the correction center position is not moved. The image height zone indicated by the arrow 511 includes the correction data used in the case where a shift operation is performed to the maximum without a tilt operation. The image height zone indicated by the arrow 510 includes the correction data used in the case where a tilt operation is performed to the maximum in addition to the shift operation.

If a tilt operation is performed as described above, the distance from the object in focus to the imaging surface changes according to the position of the image sensor 102. The correction data therefore is to be changed accordingly. A description thereof will be given with reference to FIG. 6.

Figure 6:
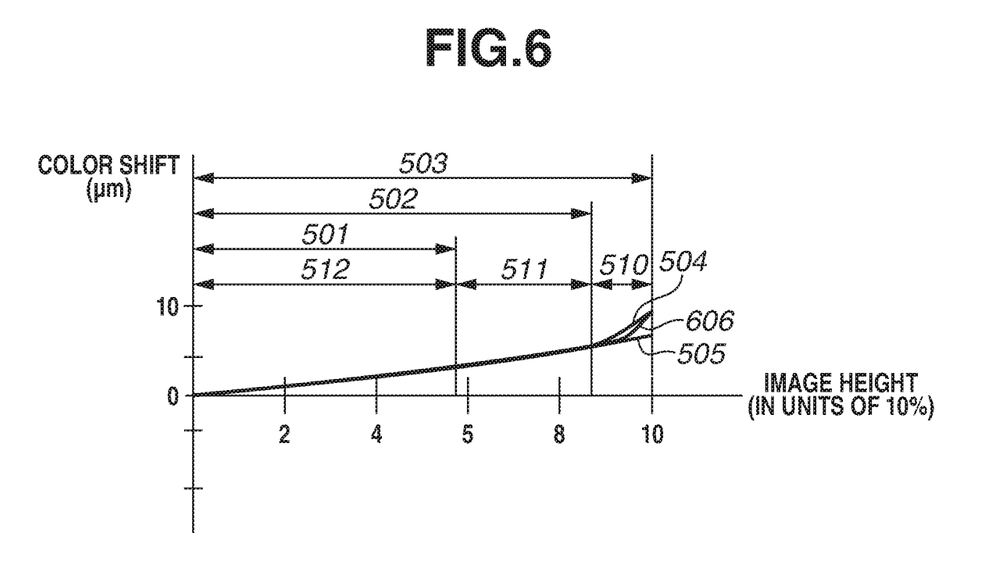
FIG. 6 is a diagram illustrating an example of correction data of optical aberration according to the exemplary embodiment of the disclosure.

FIG. 6 is an enlarged chart illustrating part of FIG. 5A. If a tilt operation is performed, in FIG. 5C, the distance from the object in focus to the imaging surface in the case of the rays focused on a position away from a central optical axis changes from the distance indicated by the arrow 513 to the distance indicated by the arrow 514. According to the tilt operation, the correction data also changes gradually from the values of the curve 505 toward those of the curve 504 and can take the values of a curve 606. For simple description, in FIGS. 5A to 5F and 6, the tilt mechanism is described to be operated after the shift mechanism is operated to the maximum. However, the tilt mechanism may be operated without the shift mechanism being operated. The correction data corresponding to each image height can be selected by replacing the movement of the correction center position by a shift operation with the movement of the correction center position by a tilt operation.

Figure 7A:
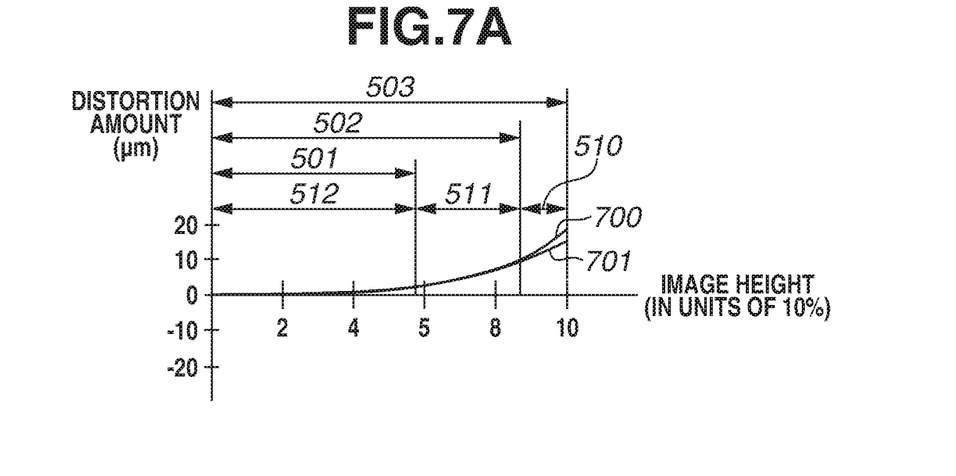
FIG. 7A is a diagram illustrating an example of correction data for a distortion aberration correction according to the exemplary embodiment of the disclosure.
Figure 7B:
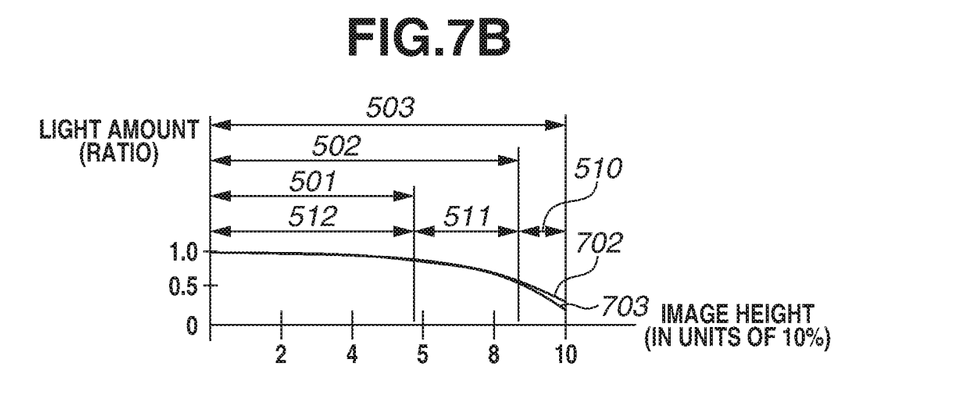
FIG. 7B is a diagram illustrating an example of correction data for a peripheral light amount correction according to the exemplary embodiment of the disclosure.
Figure 7C:
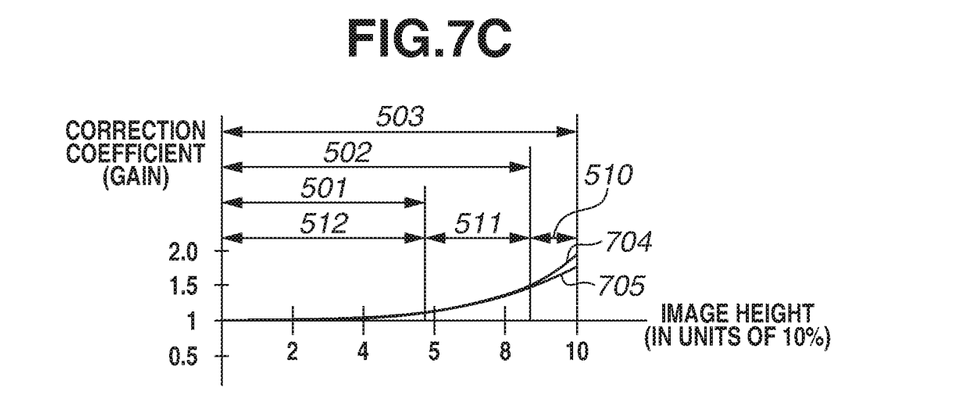
FIG. 7C is a diagram illustrating an example of correction data for image recovery processing according to the exemplary embodiment of the disclosure.

The foregoing description has been given by using the lateral chromatic aberration correction as an example. The peripheral light amount correction, the distortion aberration correction, and the image recovery processing are also processing for making a correction by using correction data according to the image height, and can be performed in a similar manner to that of the correction method of the lateral chromatic aberration. FIGS. 7A to 7C illustrate examples of such correction data.

FIG. 7A illustrates the correction data for the distortion aberration correction. The distortion aberration correction is performed by moving the barycentric position of the signal inward or outward according to the correction data for the distortion aberration correction. A curve 700 represents the correction data when the distance from the object in focus to the imaging surface is the distance indicated by the arrow 513 of FIG. 5B. A curve 701 represents the correction data when the distance from the object in focus to the imaging surface is the distance indicated by the arrow 514 of FIG. 5C.

FIG. 7B illustrates the correction data for the peripheral light amount correction. The peripheral light amount correction is performed by applying a gain to the signal. A curve 702 represents the correction data when the distance from the object in focus to the imaging surface is the distance indicated by the arrow 513 of FIG. 5B. A curve 703 represents the correction data when the distance from the object in focus to the imaging surface is the distance indicated by the arrow 514 of FIG. 5C.

FIG. 7C illustrates the gain of a correction coefficient in the image recovery processing. The image recovery processing is performed by performing a plurality of multi-tap filter processes according to the correction coefficient, and applying the gain according to the imaging condition to each filter. A curve 704 indicates the gain of the correction coefficient when the distance from the object in focus to the imaging surface is the distance indicated by the arrow 513 of FIG. 5B. A curve 705 indicates the gain of the correction coefficient when the distance from the object in focus to the imaging surface is the distance indicated by the arrow 514 of FIG. 5C.

Next, a method for calculating the moving amount of the correction center position will be described with reference to FIGS. 8A and 8B.

As illustrated in FIG. 2C, a tilt operation tilts the optical axis with respect to the imaging surface. To perform the optical aberration corrections by conventional correction methods, the moving amount of the optical axis on the imaging surface is calculated and converted into the moving amount of the optical axis perpendicular to the imaging surface so that the moving amount can be handled as if the optical axis is moved by a shift. The moved position of the optical axis is then used as the correction center position.

Figure 8A:
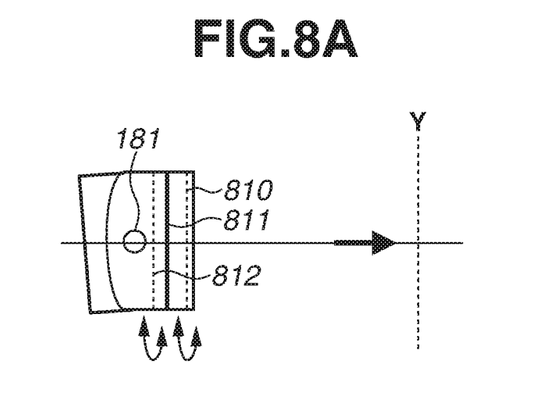
FIG. 8A is a diagram for describing the tilt mechanism according to the exemplary embodiment of the disclosure.

As illustrated in FIG. 8A, the TS mechanism 180 includes the tilt mechanism for tilting the entire optical system about the rotation center axis 181 of a tilt, and a shift mechanism 811 for shifting the optical axis of the optical system. The TS mechanism 180 further includes an overall revolving mechanism 810 for simultaneously changing the tilt direction and the shift direction, and a TS revolving mechanism 812 for changing the tilt direction and the shift direction in respective different directions.

The overall revolving mechanism 810 rotates the entire optical system of the TS mechanism 180 on a plane perpendicular to the optical axis. The TS revolving mechanism 812 rotates the tilt mechanism on the perpendicular plane with respect to the shift mechanism.

The moving amount of the correction center position of the optical aberration corrections is determined by determining the moving amounts corresponding to a shift operation amount and a tilt operation amount, respectively, and adding the moving amounts determined.

The moving amount of the correction center position according to a shift operation is calculated from the shift operation amount.

The moving amount of the correction center position according to a tilt operation is calculated from the tilt rotation center distance 200 and the tilt angle 205 illustrated in FIG. 2C. The tilt rotation center distance 200 is the distance between the rotation center axis 181 of the tilt mechanism and the imaging surface of the image sensor 102. Information indicating the tilt rotation center distance 200 of each model of the lens apparatus 150 may be stored in the imaging apparatus 100 in advance. The imaging apparatus 100 may receive such information from the lens apparatus 150. If the information about the tilt rotation center distance 200 is unable to be obtained, the operation flow may skip the optical aberration corrections.

Figure 8B:
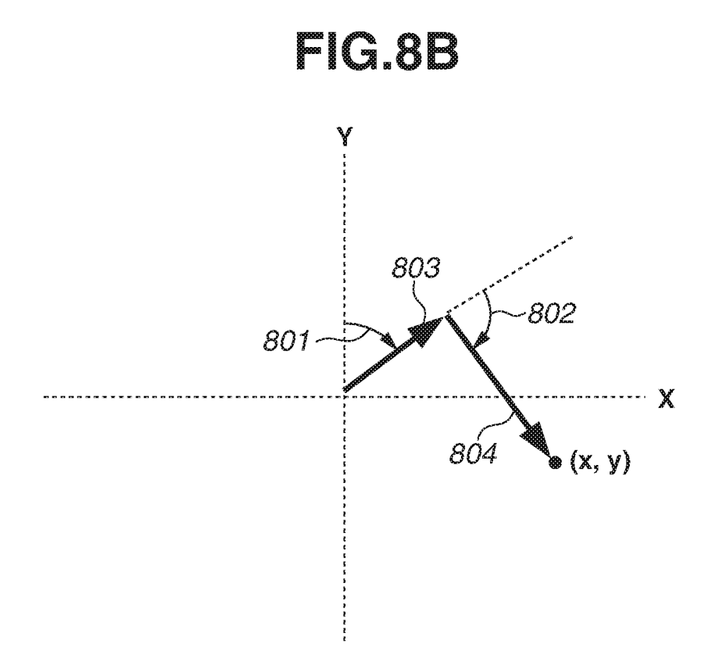
FIG. 8B is a diagram for describing a correction center position of optical correction.

FIG. 8B is a diagram for describing the correction center position of the optical aberration corrections. FIG. 8B is an XY plan view of a plane on the imaging surface as seen from the object side of the optical axis, with the origin at the center of the imaging surface in the state where neither a tilt operation nor a shift operation is performed.

FIG. 8B illustrates a state where the overall revolving mechanism 810 is rotated by an angle (overall revolving rotation angle) 801, and only the tilt mechanism is further rotated by an angle (TS revolving rotation angle) 802 by using the TS revolving mechanism 812. The arrow 803 represents the movement of the coordinates of the optical axis by a shift operation, and the arrow 804 represents the movement of the coordinates of the optical axis by a tilt operation. Since the optical aberration corrections are performed about the optical axis, not the center of the imaging surface, the optical aberration corrections according to the image height can be made by using the moved coordinates (x, y) of the optical axis as the correction center position.

The moved coordinates (x, y) of the optical axis are determined in the following manner. Suppose that S is the shift operation amount indicated by the arrow 803, and T is the tilt angle 205. Suppose also that Ra is the overall revolving rotation angle 801, Rts is the TS revolving rotation angle 802, and C is the tilt rotation center distance 200. All such information is included in the TS information that the system control circuit 130 obtains in step S506 of FIG. 5. Also, π represents pi.

The direction of the arrow 803 changes within the XY plane according to the overall revolving rotation angle 801. The moved coordinates of the optical axis according to the shift operation amount S therefore are to be broken down and calculated in X- and Y-axis directions. A moving amount xs of the optical axis in the X-axis direction according to the shift operation amount S and a moving amount ys in the Y-axis direction can be determined by the following equations:

$$xs = S \times \cos((90-Ra)/360 \times 2\pi) \quad (1), \text{and}$$

$$ys = S \times \sin((90-Ra)/360 \times 2\pi) \quad (2).$$

A moving amount rt of the optical axis by a tilt operation can be determined by the following equation:

$$rt = \tan(T/360 \times 2\pi) \times C \quad (3).$$

The moving amount rt is to be broken down into the X- and Y-axis directions for calculation, based on the overall revolving rotation angle 801 and the TS revolving rotation angle 802. A moving amount xt of the optical axis in the X-axis direction according to the tilt operation amount and a moving amount yt in the Y-axis direction can be determined by the following equations:

$$xt = rt \times \cos((90-(Ra+Rts))/360 \times 2\pi) \quad (4), \text{and}$$

$$yt = rt \times \sin((90-(Ra+Rts))/360 \times 2\pi) \quad (5).$$

The final moving amount of the correction center position is the sum of the moving amount by the shift direction and the moving amount by the tilt operation. A moving amount xa of the correction center position in the X-axis direction and a moving amount ya in the Y-axis direction can be determined by the following equations:

$$xa = xs + xt \quad (6), \text{and}$$

$$ya = ys + yt \quad (7).$$

The coordinate center position (x, y) can be obtained by converting (xa, ya) into coordinates on the XY plane. The correction center position is a numerical value for use in calculating the image height, and therefore does not necessarily need to fall on the imaging surface of the image sensor 102. In some cases, the correction center position may be located outside the imaging surface.

Image heights for which correction data is needed to be prepared are determined based on the maximum value of the moving amount of the correction center position. The maximum value of the moving amount of the correction center position can be calculated by using equations (1) to (7), where a maximum value Smax of the shift operation amount of the lens apparatus 150 is substituted into S, and a maximum value Tmax of the tilt angle 205 into T. The overall revolving rotation and the TS revolving rotation may be in any direction. In short, a maximum value rmax of the moving amount of the correction center position can be determined by the following equation:

$$r\text{max} = S\text{max} + \tan(T\text{max}/360 \times 2n) \times C \qquad (8).$$

The optical aberration correction data thus includes correction data for image heights according to the maximum value Smax of the shift operation amount, the maximum value Tmax of the tilt angle 205, and the tilt rotation center distance C. Here, $-90° < T\text{max} < +90°$.

The maximum moving amount of the optical axis depends on the model of the lens apparatus 150. The size of the imaging surface of the image sensor 102 varies from one model of the imaging apparatus 100 to another. The range of correction data needed therefore varies according to a combination of such factors.

In the present exemplary embodiment, for ease of description, the optical axis 201 is described to pass through the center of the imaging surface when neither a tilt operation nor a shift operation is performed. However, this is not restrictive. If the optical axis 201 does not pass through the center of the imaging surface, the center of the imaging surface and the position of the optical axis 201 may be offset in advance.

As has been described above, according to the present exemplary embodiment, a change in an optical aberration characteristic due to a tilt operation is regarded and processed as resulting from a movement of the correction center position as with a change in the optical aberration characteristic due to a shift operation. Correction data corresponding to a tilt operation therefore does not need to be prepared aside from that for a shift operation. Appropriate optical characteristic corrections corresponding to not only the shift amount but also the tilt amount can thus be made without much increasing the correction data.

The present exemplary embodiment has been described by using, as an example, a configuration in which the optical aberration corrections are made inside the imaging apparatus 100 on which the lens apparatus 150 is mounted. However, this is not restrictive. An exemplary embodiment of the disclosure is also applicable to an external image processing apparatus, such as a personal computer (PC) and a tablet terminal, that receives image data captured by using a lens apparatus including a TS mechanism from an imaging apparatus or a network, and makes optical aberration corrections to the image data. Here, the information included in the TS information may be included into tag data accompanying the image data, in which case the information for calculation of the moving amount of the correction center position can be obtained without direct communication between the image processing apparatus and the lens apparatus.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-162175, filed Aug. 25, 2017, and No. 2018-133161, filed Jul. 13, 2018, which are hereby incorporated by reference herein in their entirety.

What is claimed is:

1. An imaging apparatus comprising:
   an image sensor that generates image data;
   a mount unit on which a lens apparatus including a tilt mechanism that tilts a lens with respect to an imaging surface of the image sensor is detachably mounted; and
   a correction circuit that performs image processing according to an optical characteristic of the lens apparatus on image data generated by the image sensor by performing image capturing using the lens apparatus,
   wherein the correction circuit obtains tilt information from the lens apparatus by communication, the tilt information indicating a distance from a rotation center of the tilt mechanism of the lens apparatus to the imaging surface and an angle by which the lens is tilted, changes a correction center position in the image data based on the tilt information, and performs the image processing, in accordance with correction data including a value corresponding to an image height with reference to the correction center position.

2. The imaging apparatus according to claim 1, further comprising a notification apparatus that, in a case where the tilt information is successfully obtained, makes a notification to a user.

3. The imaging apparatus according to claim 1,
   wherein the correction circuit
   obtains shift information from the lens apparatus by communication, the shift information indicating an amount of parallel movement of the lens by a shift mechanism that moves the lens in parallel with the imaging surface, and changes the correction center position in the image data based on the shift information.

4. The imaging apparatus according to claim 3, wherein the correction circuit changes the correction center position in the image data based on the tilt information and the shift information.

5. The imaging apparatus according to claim 1,
wherein the lens apparatus comprises a memory and a communication apparatus, and the communication apparatus transmits the tilt information stored in the memory to the imaging apparatus.

6. A lens apparatus to be detachably mounted on an imaging apparatus including an image sensor, the lens apparatus comprising:
a tilt mechanism that performs a tilt operation for tilting a lens with respect to an imaging surface of the image sensor;
a memory that stores information about the lens apparatus; and
a communication apparatus that transmits the information stored in the memory to the imaging apparatus,
wherein the information includes information corresponding to a distance from a rotation center for tilting the lens to the imaging surface of the image sensor, and information about a tilt angle of the tilt operation.

7. The lens apparatus according to claim 6, further comprising a rotation mechanism for rotating the tilt mechanism about an optical axis of the lens with respect to a part mounted on the imaging apparatus,
wherein the information further includes an angle of rotation of the rotation mechanism.

8. The lens apparatus according to claim 6, further comprising a shift mechanism that moves the lens in parallel with the imaging surface,
wherein the information further includes a shift operation amount of the shift mechanism.

9. The lens apparatus according to claim 8, further comprising:
a first rotation mechanism for rotating the tilt mechanism about an optical axis of the lens with respect to a part mounted on the imaging apparatus; and
a second rotation mechanism for rotating the shift mechanism about the optical axis of the lens with respect to the part mounted on the imaging apparatus,
wherein the information includes an angle of rotation of the first rotation mechanism and an angle of rotation of the second rotation mechanism.

10. The lens apparatus according to claim 6, further comprising a memory and a communication apparatus,
wherein the communication apparatus transmits the tilt information stored in the memory to the imaging apparatus.

11. An image processing method for performing image processing according to an optical characteristic of a lens apparatus on image data captured by using the lens apparatus, the lens apparatus including a tilt mechanism that tilts a lens with respect to an imaging surface of an image sensor included in an imaging apparatus and to be detachably mounted on the imaging apparatus, the image processing method comprising:
obtaining tilt information from the lens apparatus by communication, the tilt information indicating a distance from a rotation center of the tilt mechanism of the lens apparatus to the imaging surface and an angle by which the lens is tilted;
changing a correction center position in the image data based on the tilt information; and
performing the image processing on the image data, in accordance with correction data including a value corresponding to an image height with reference to the correction center position.

12. The image processing method according to claim 11,
wherein the lens apparatus includes a memory and a communication apparatus, and
wherein the communication apparatus transmits the tilt information stored in the memory to the imaging apparatus.

13. The imaging method according to claim 11, further comprising making a notification to a user, in a case where the tilt information is successfully obtained, makes a notification to a user.

14. The imaging method according to claim 11, further comprising obtaining shift information from the lens apparatus by communication, the shift information indicating an amount of parallel movement of the lens by a shift mechanism that moves the lens in parallel with the imaging surface, and changes the correction center position in the image data based on the shift information.

15. The imaging method according to claim 14, further comprising changing the correction center position in the image data based on the tilt information and the shift information.

16. A non-transitory nonvolatile storage medium storing a program to be executed by a computer of an imaging apparatus that performs image processing according to an optical characteristic of a lens apparatus on image data captured by using the lens apparatus including a tilt mechanism that tilts a lens with respect to an imaging surface of an image sensor included in an imaging apparatus and to be detachably mounted on the imaging apparatus, the program comprising:
obtaining tilt information from the lens apparatus by communication, the tilt information indicating a distance from a rotation center of the tilt mechanism of the lens apparatus to the imaging surface and an angle by which the lens is tilted;
changing a correction center position in the image data based on the tilt information; and
performing the image processing on the image data, in accordance with correction data including a value corresponding to an image height with reference to the correction center position.

17. The non-transitory nonvolatile storage medium according to claim 16,
wherein the lens apparatus includes a memory and a communication apparatus, and
wherein the communication apparatus transmits the tilt information stored in the memory to the imaging apparatus.

18. The non-transitory nonvolatile storage medium according to claim 16, further comprising making a notification to a user, in a case where the tilt information is successfully obtained, makes a notification to a user.

19. The non-transitory nonvolatile storage medium according to claim 16, further comprising obtaining shift information from the lens apparatus by communication, the shift information indicating an amount of parallel movement of the lens by a shift mechanism that moves the lens in parallel with the imaging surface, and changes the correction center position in the image data based on the shift information.

20. The non-transitory nonvolatile storage medium according to claim 19, further comprising changing the correction center position in the image data based on the tilt information and the shift information.

* * * * *